United States Patent
Antonopoulos et al.

(10) Patent No.: US 10,438,008 B2
(45) Date of Patent: Oct. 8, 2019

(54) ROW LEVEL SECURITY

(71) Applicant: Microsoft Technology Licensing, LLC, Redmond, WA (US)

(72) Inventors: Panagiotis Antonopoulos, Redmond, WA (US); Jack Richins, Bothell, WA (US); Michael James Zwilling, Bellevue, WA (US); Conor Cunningham, Austin, TX (US); Raul Garcia, Kirkland, WA (US); Craig Freedman, Sammamish, WA (US); Erik Ismert, Shoreline, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 307 days.

(21) Appl. No.: 14/528,617

(22) Filed: Oct. 30, 2014

(65) Prior Publication Data
US 2016/0125189 A1    May 5, 2016

(51) Int. Cl.
  *G06F 7/04*  (2006.01)
  *G06F 17/30*  (2006.01)
  *H04N 7/16*  (2011.01)
  *G06F 21/60*  (2013.01)
  *G06F 21/62*  (2013.01)

(52) U.S. Cl.
  CPC ........ *G06F 21/604* (2013.01); *G06F 21/6227* (2013.01)

(58) Field of Classification Search
  CPC ............. G06F 21/6227; G06F 21/6218; G06F 21/604; G06F 21/60; G06F 21/62; G06F 21/6209
  See application file for complete search history.

(56) References Cited

U.S. PATENT DOCUMENTS

| | | | | |
|---|---|---|---|---|
| 5,940,819 A | * | 8/1999 | Beavin | G06F 17/30306 |
| 7,711,750 B1 | * | 5/2010 | Dutta | G06F 21/6227 707/784 |
| 2004/0250098 A1 | * | 12/2004 | Licis | G06F 21/6227 713/193 |
| 2005/0038783 A1 | * | 2/2005 | Lei | G06F 17/30522 |
| 2005/0209988 A1 | * | 9/2005 | Cunningham | G06F 17/30471 |
| 2006/0122975 A1 | * | 6/2006 | Taylor | G06F 17/30306 |
| 2006/0136493 A1 | * | 6/2006 | Muralidharan | G06F 21/6227 |
| 2011/0202560 A1 | * | 8/2011 | Bowers | G06F 17/30401 707/773 |

(Continued)

*Primary Examiner* — Trong H Nguyen
*Assistant Examiner* — Amie C. Lin
(74) *Attorney, Agent, or Firm* — Alleman Hall Creasman & Tuttle LLP

(57) ABSTRACT

A system and method of enabling row level security through security policies is disclosed herein. In this system and method, a computing device may be communicatively coupled to a storage device. The computing device may further be activated and maintain data that comprises a plurality of rows. When executed by the computing device, the system and method may process a data definition language statement comprising a security policy definition. Further, the system and method may receive a query language statement comprising a request to access a first column of a row from the plurality of rows. The system and method may process the request and determine if access may be granted to a user based on the security policy definition in the system.

20 Claims, 10 Drawing Sheets

(56) References Cited

U.S. PATENT DOCUMENTS

2012/0323885 A1\* 12/2012 Wang ................ G06F 17/30448
                                                    707/714
2013/0124500 A1\*  5/2013 Beavin .............. G06F 17/30448
                                                    707/714
2013/0218911 A1\*  8/2013 Li ..................... G06F 17/30289
                                                    707/754
2013/0311454 A1\* 11/2013 Ezzat ............... G06F 17/30539
                                                    707/722

\* cited by examiner

ROW LEVEL SECURITY

BACKGROUND

Organizations that use databases often have a need to control what data is accessible to individual users of the database at a row level of granularity. For example, a business may have a single table storing customer information that all employees need to have access to. However, some employees should only be able to view the customer history of particular customers. Table level and column level security cannot enforce this logic since all employees need to have access to the table and the columns. However, such access can be implemented using row level security.

SUMMARY

A system and method of enabling row level security through security policies is disclosed herein. In this system and method, one or more computing devices may be communicatively coupled to a storage device. The computing devices may further be activated and maintain data that comprises a plurality of rows. In this system and method, one or more memories may include or have stored computer readable instructions. When executed by the one or more computing devices, the system and method may process a data definition language statement comprising a security policy definition. The security policy definition may comprise an association between the plurality of rows and a function. Further, the system and method may receive a query language statement comprising a request to access a first column of a row from the plurality of rows. The query language statement may be processed on behalf of a security principal. Furthermore, the system and method may identify an object associated with a parameter of the function, or referenced by the function. Such that an access control associated with the security principal may be indicative of the security principal being unauthorized to access the object. Based at least in part on a result of evaluating the function, the system and method may also determine that the security principal may be authorized to access the first column of the row. The evaluation of the function may comprise of overriding the access control to allow access to the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION OF ILLUSTRATIVE EMBODIMENTS

Figure 1:
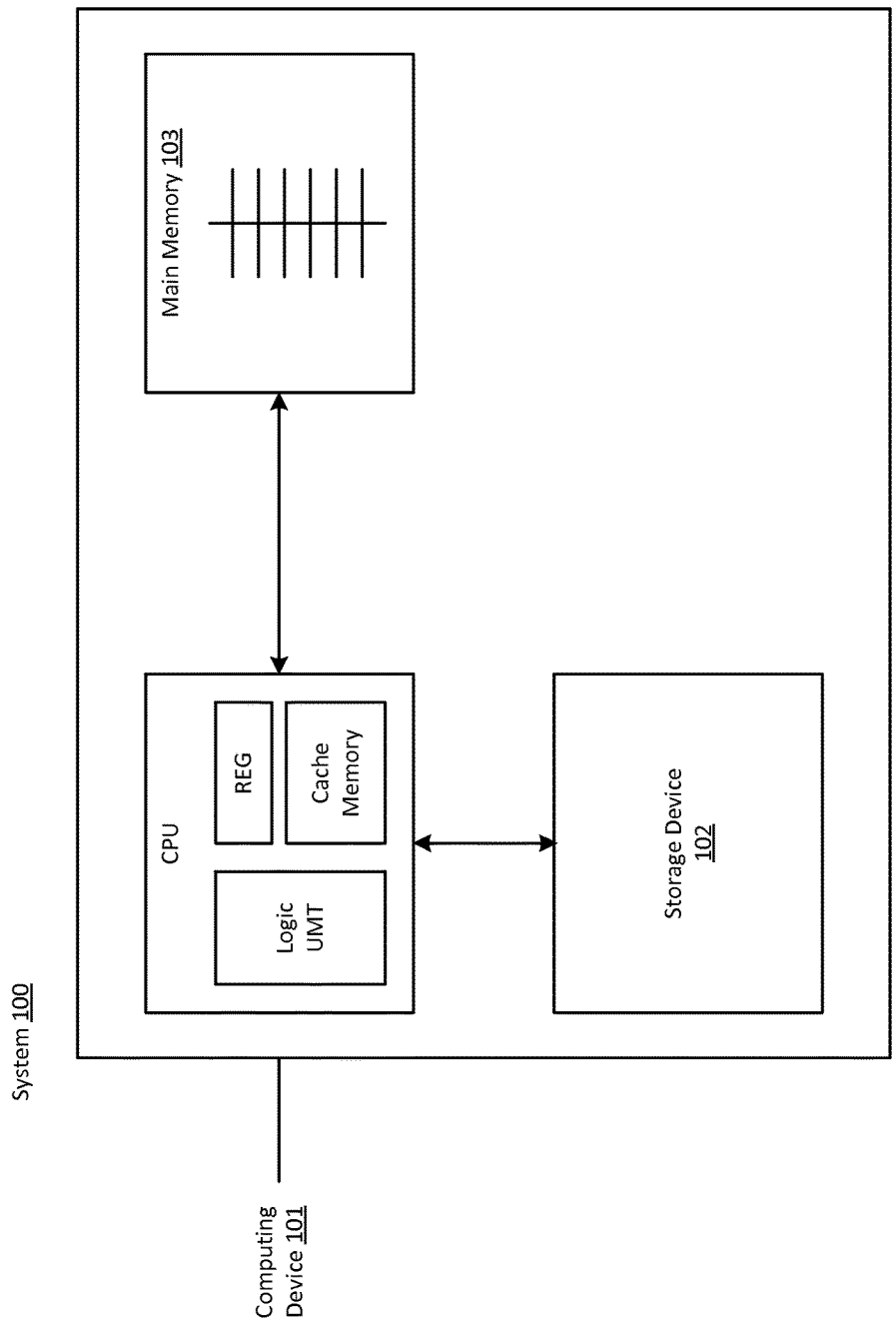
FIG. 1 is a general computing environment illustrating the relationship between a computing device, storage device, and memory.

Technological advances in computer hardware, software and networking have led to increased demand for electronic information exchange rather than through conventional techniques such as paper and telephone correspondence, for example. Such electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

As the amount of available electronic data grows, it becomes more important to store such data in a manageable manner that facilitates user-friendly and quick data searches and retrieval. Today, a common approach is to store electronic data in one or more databases. In general, a typical database is an organized collection of information structured such that a computer program, for example, can quickly search and select data. Traditionally, data stored within a database is organized via one or more tables, wherein respective tables comprise sets of records and a record comprises a set of fields. Records are commonly indexed as rows within a table and the record fields are commonly indexed as columns such that a row/column pair can reference particular datum within a table.

Data stored in a database often includes personal (e.g., bank account and social security numbers) and sensitive information (e.g., medical records) and may not be backed up via hard copies. Therefore, security related to databases and data stored therein is growing in importance. However, many present database security techniques can be breached, for example, through software holes and/or by software hackers with malicious intent, or do not provide a comprehensive level of security.

Organizations need to have control over what data may be accessible to each user of the database at the row level of granularity. One example scenario is where patient information in a medical facility is stored in a database and all the doctors of the medical facility may need to access the information. Each doctor may be able to see all the medical history of all the patients. However, each doctor should only be able to see the medical history of his own patients. Table level and column-level security cannot enforce this logic since all doctors need to have access to the table and the columns. Row-level security may be beneficial in this scenario. In row-level security, a security manager may define a policy for the patients table and describe that each doctor only has access to the rows that correspond to his own patients.

One approach to solving this problem may comprise either moving all the security logic inside the application or by creating separate views for each user in order to apply the security logic there. The former solution places a burden on the application and may not necessarily protect against direct access to the database. The latter solution can introduce a large number of additional views that need to be created and managed. At the same time, the latter solution requires application changes, since data access has to go through the views.

Disclosed herein is database system with an improved mechanism for providing row-level access control. Various systems, methods, and computer program products may be employed in conjunction with the practice of various aspects of the present disclosure. Aspects of the present disclosure may be employed in an improved mechanism for providing row-level access control. This may comprise maintaining a table or other collection of data. The collection of data may, for example, comprise a plurality of rows or other data collections, such as values associated with a key. As used herein, these collections of data may be referred to as table comprising rows of values. The values within a row may be organized as columns. The term column may also be applied to less structured data forms, such as collections of key value pairs.

Aspects of the present disclosure may comprise processing a data definition language statement that includes a security policy definition. A security policy definition may comprise an association between rows of a table and a function. The function may, for example, be a table-valued function or a scalar function. It may accept as input values corresponding to a column of a table, or to a single input value corresponding to a column of a row. Its return value may indicate whether access to the row is to be permitted or denied. For example, table-valued function might accept a column of values corresponding to attributes that are to be evaluated in determining which rows of the table or to be permitted or denied to the requesting user. The return value for such a function might comprise an output table containing a column indicative of permitting or denying access to the requesting user, where each row in the output table is determined with respect to the input column values.

A query language statement may be received, and may comprise a request to access a first column of a row of a table. The request to access the information may be associated with a security principal, on whose behalf the query language statement is to be processed.

The security policy definition may include a reference to an object, which may be associated with the function defined as part of the security policy. In various aspects, the object may be identified as being associated with a parameter of the function, or otherwise referenced by the function. There may be an access control associated with the security principal that is indicative of the security principal being unauthorized to access the object. More generally, the security policy definition may include a reference to an object, which may include an object in the same table or a different table, or to other database objects such as particular rows, values, functions, and so on.

Access to the first column, on the other hand, may be controlled by the function defined in the security policy definition. Aspects of the present disclosure may involve determining that the security principal is authorized to access the first column of the row, based at least in part on results obtained by evaluating the function. Because the function may require access to the object and the access control may limit the security principal's access rights to the object, evaluating the function may comprise overriding the access control to allow the object to be accessed, in order to supply its value to a parameter of the function. In this manner, the function may be evaluated even when the access control would, under regular operating conditions, prevent the security principal from accessing the column.

Overriding the access control may occur during at least one of algebraization of the query, optimization of the query, or execution of a query plan produced by optimization. Optimization of the query may be performed based on the result of evaluating the function. The optimization may involve inlining a scalar-valued function, joining a table-valued result of the function with another table value, and forming a query representation comprising a predicate node indicative of the association between the plurality of rows and the function. A query representation may refer to various structures, such as the output of an algebraization stage, the output of a query optimization stage, and so on.

In some cases, a system comprising aspects of the present disclosure may receive information indicative of a value for use in evaluating a function associated with a security policy. The value may, for example, be received from a middle-tier client by execution of a data definition language statement, query language statement, call-level interface invocation, and so on. The system may evaluate the function based at least in part on the received value, in addition to or instead of a value supplied as a parameter to the function. The system may utilize an access control policy to limit access to the value.

Referring now to FIG. 1, FIG. 1 depicts an illustration of a database management system 100 with an improved mechanism for providing row-level access control. The system 100 may comprise one or more computing devices 101 coupled to one or more storage devices 102. The computing device 101, when activated, may maintain data comprised of a plurality of rows. The system 100 may include one or more memories 103 with computer readable instructions. The instructions may cause the system 100 to process a data definition language statement comprising a security policy definition.

The security policy definition may provide for the association between the data and a function. For example, the instructions on the system 100 may create a T-SQL Inline Table Valued Function that implements a security logic, which in turn, may create a security policy definition. The security policy definition may assign the function to a table, containing a plurality of rows, in order to enable row-level security.

A table comprising a plurality of rows may include data or information that a user may attempt to access in the system 100. As such, in the preferred aspect, creating a security policy that assigns a function to a table may be performed. The function may contain some sort of input parameter in relation to a row on a table. The input parameter and the return value of a function may be table valued.

The system 100 may further receive a query language statement from a user attempting to request access to a row of the plurality of rows located in the table. In other words, the query language statement may be indicative of a user requesting access to information or data located in the table. As an illustration, one example may include the function that contains a patient's medical record number as an input parameter to the system 100. Accordingly, when a user is searching, querying, or seeking this patient's medical record, the system 100 may allow access to the patient's medical record if the user is the patient's doctor. Therefore, by applying the security policy through assigning a function to the table, rows may be filtered and presented to each individual user. In other words, when querying is performed on the table the rows presented to the user may have been filtered based on the information in the security policy. In the preferred illustration, assigning a function to a table may be a more efficient way of performing this sort of row-level security than to provide security logic in the form of a string.

Furthermore, the input parameter of the function may identify a second column of data, or more generally an object, which may include a second column or other database objects such as rows, functions, values, environment settings, and so on. The user may request access to the object of a row of the plurality of rows and may be denied access. The security logic would thus cause the system 100 to deny access to the requested data by the user. However, the system 100 may override the access control in the system 100 and permit access to the data for use in evaluating the security logic. The system 100 may thereby permit access to the object for use as an input parameter to the function. The system 100 would not, however, permit direct access to the column by the user.

The overriding of access control in the system 100 may occur during algebraization of the query, optimization of the query, or execution of a query plan produced by optimization. Thus, based on the results of evaluating the function, the system 100 may allow or deny access, at the row-level, to a user when requesting information or data in the table.

Figure 2:
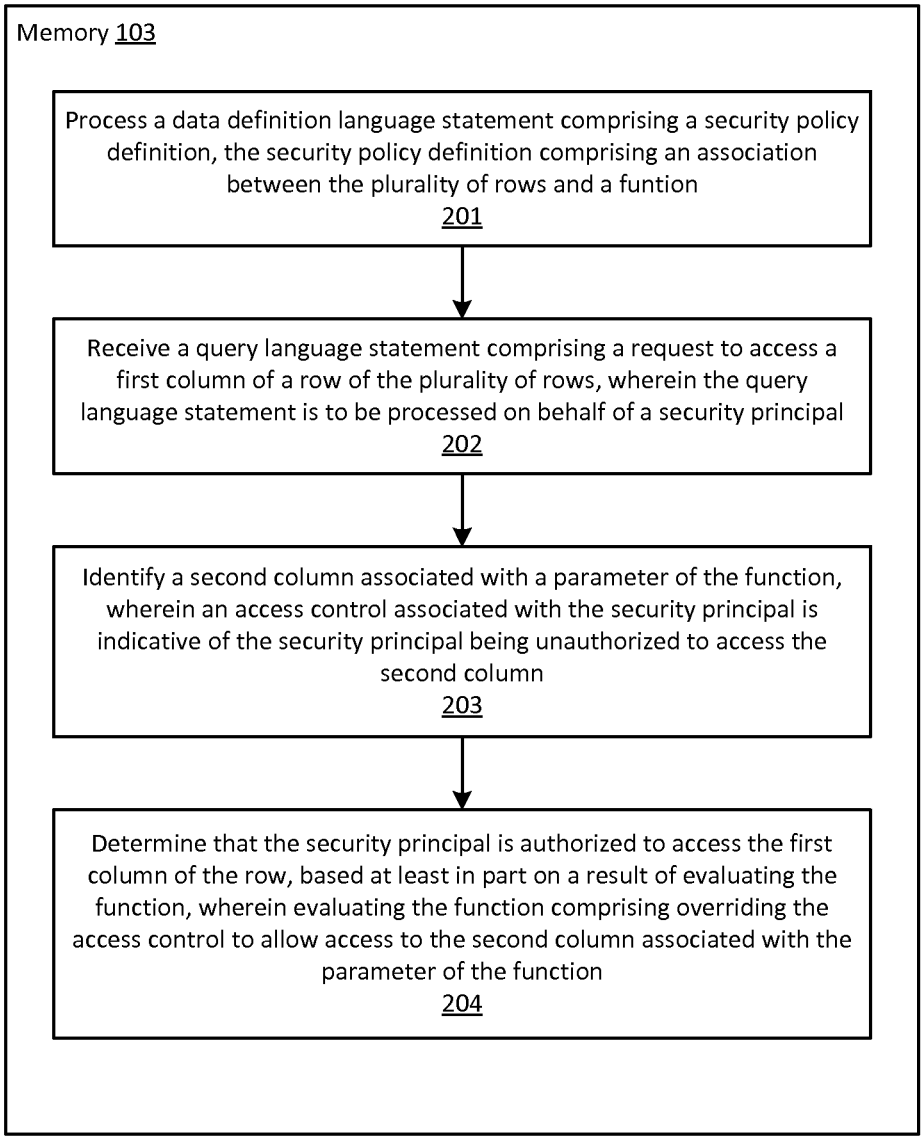
FIG. 2 is a block diagram representing the computer readable instructions that may be performed on the system to improve the mechanism for providing row-level access control on data.

Referring now to FIG. 2 and further referencing FIG. 1, FIG. 2 is a flowchart illustrating an example process for providing row-level access control. In an embodiment, the process may be implemented in a system having one or more memories storing computer readable instructions that, when executed by one or more processors of the system, cause the system 100 to perform the process. As one example, looking to block 201, the system 100 may process a data definition language statement. The data definition language statement may include a security policy definition. For example, the security policy definition may assign a function with "Patient ID" as an input parameter. The function with "Patient ID" as an input parameter may further be applied to a dataset or a table of data in the system 100. Hence, any user query applied on the table would have to apply the logic of the function. Rows may then be filtered out or accessible to the user depending on the user's credentials and the function. In other words, the security policy definition may act as a bridge between the data set or table and the function assigned. The bridge may assist in defining which data or portions of data the user may access from the table. The bridge may also include a predicate node indicating any sort of association between the plurality of rows of the table and the function.

Further looking to block 202, the system 100 may receive a query language statement to request access to first column of a row of the plurality of rows. Block 202 helps further illustrate the example of a user attempting to access a portion of a table. The user here may also be depicted as a security principal or a client, whom may be attempting to access a portion of the table located in the system 100. In block 203, the user may attempt to access a second or additional portion of the table and may be denied access by the system 100. Depending on the security policy and the function associated with the security policy assigned to the table, the user may not have entire access to the table or dataset. In block 204, the system 100 performs this determination of which portions of the dataset or table, the user may be allowed to access. Again, the determination is based on the function assigned to the table by the security policy definition as mentioned above.

Referring to FIG. 2, the described process may, for example, be illustrated by a user querying a table. Thus, once obtained in the system 100 and assigned to the table, the function may be evaluated in conjunction with the processing of a query. When the system 100 is processing the query on the table, the results of the evaluation may be a table value. The table value may also further be joined with another table. After evaluation of the function, (e.g., the system 100 attempting to perform an optimization of the query) the data or the request to access a portion of the table may or may not be presented to the user. The optimization of the query may also be based on evaluating the function as an inline scalar-valued function. Further, the illustrations above are not limited to evaluating a single return value from a single input parameter of a function. More than one input may considered and associated with the parameter of the function. Thus, a second or additional return values may be processed and eventually evaluated by the system 100.

To further illustrate the process of FIG. 2, in one example, a user (e.g., a doctor) may want to query or look at a patient's medical record. However, a patient's medical record may be located in a dataset or table with all other patient's medical records and information. Thus, it would be ideal for the system 100 to present to the doctor just the information of his/her own patient and not the information of other patients. Hence, as mentioned above, based on the input parameter in the function as set forth by the security policy definition on the table, the system 100 may make the determination through evaluation of the return value on whether the user (the doctor) may have access to the patient's medical record.

Figure 3A:
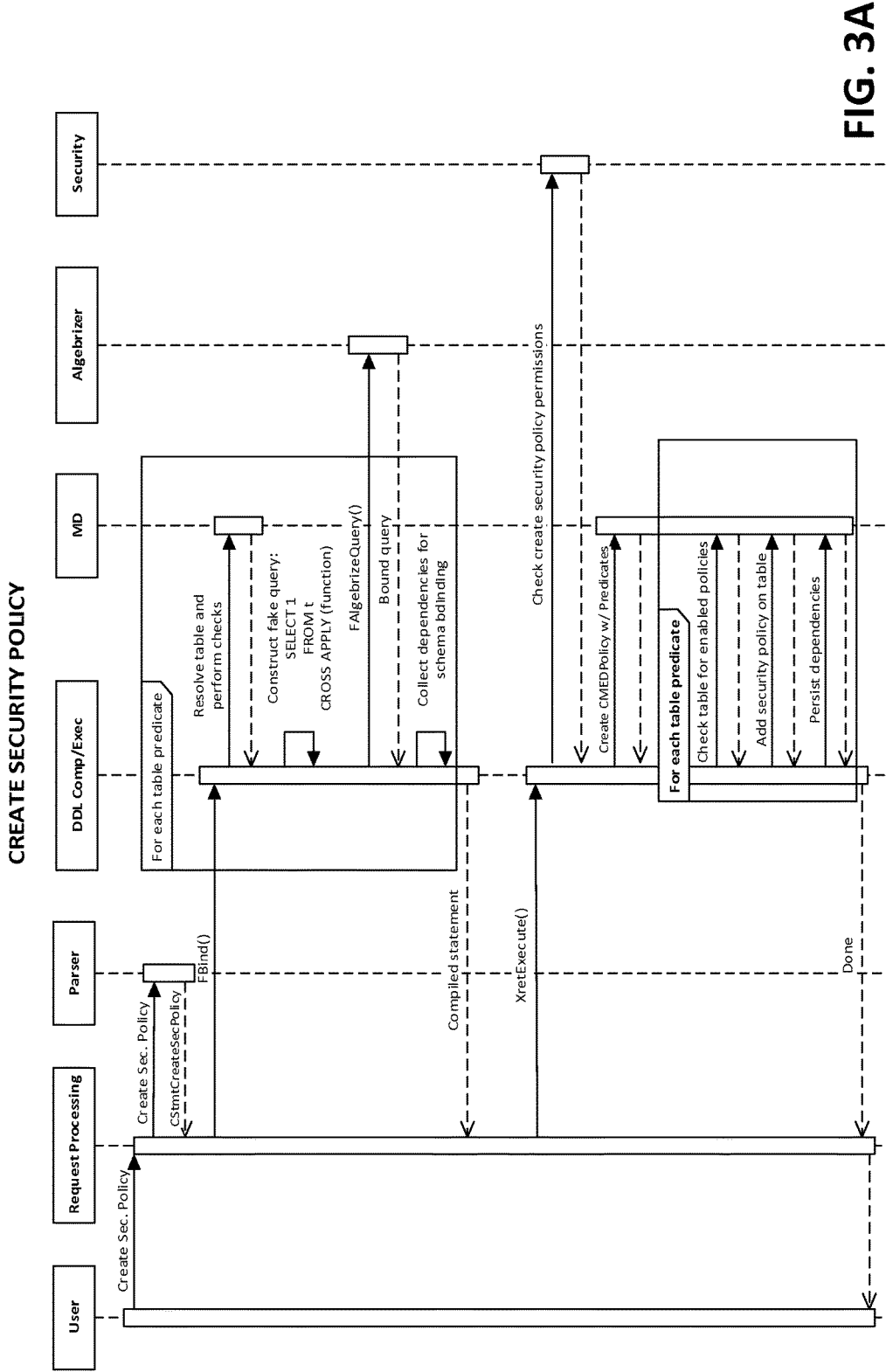
FIG. 3A is a workflow layout and illustration of the interactions of internal components when creating a security policy in a system.
Figure 3B:
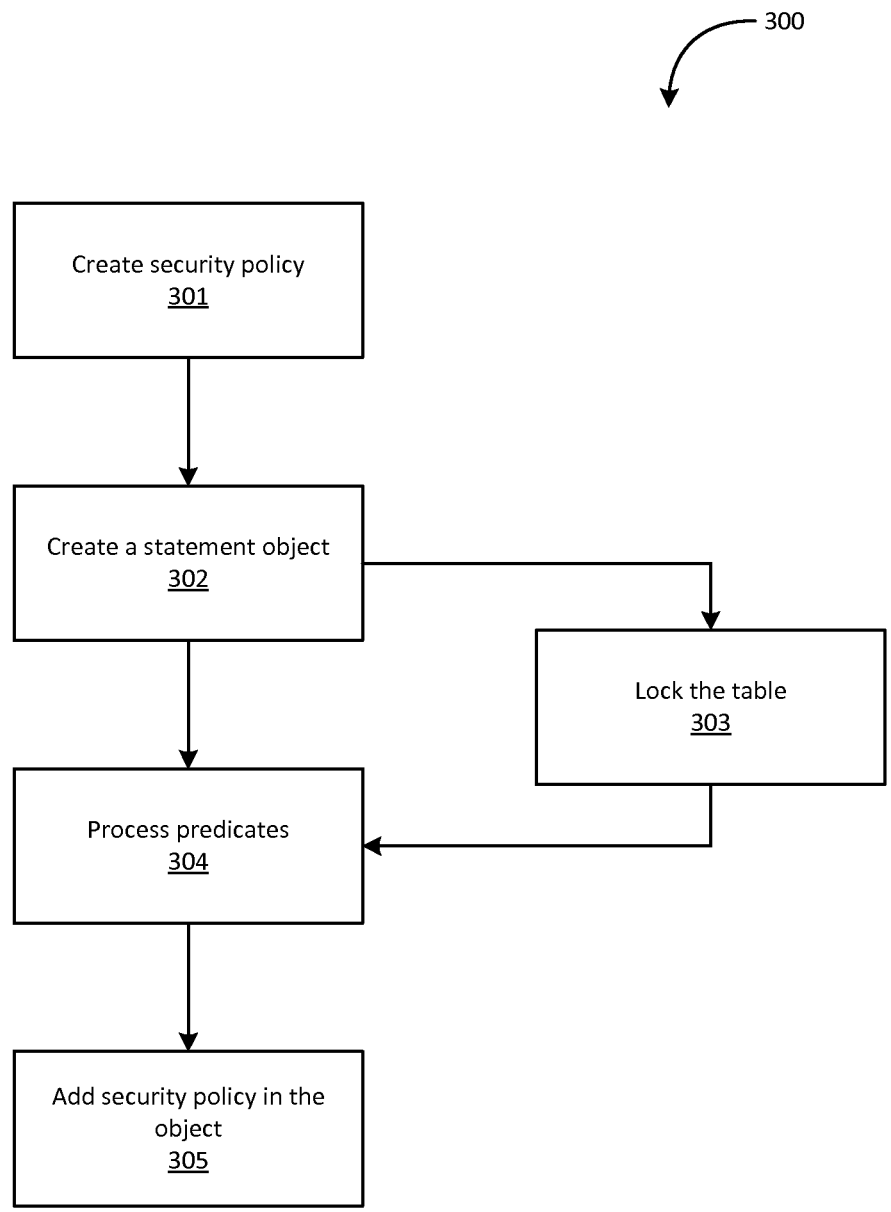
FIG. 3B is a block diagram representing the process of creating a security policy in a system.

Referring now to FIGS. 3A and 3B, depicts how a security policy may be compiled or created in the system 100. FIG. 3A depicts the architectural and workflow layout of creating a security policy. FIG. 3A further depicts how the components interact in the creation of a security policy. Referring to FIG. 3B, block 301 illustrates that a security policy may be compiled or created in system 100. The security policy may be created in response to a user executing a CREATE SECURITY POLICY statement. The statement may then be parsed and a statement object may be created (as shown in block 302). The statement object may include all the required information about the security policy (e.g., name, predicates, state, etc.). During binding, the system 100 may process each predicate (as depicted in block 304). After resolving the table name and if the policy is to be enabled, the system 100 may construct a tree for an artificial query as "SELECT 1 FROM <table name> CROSS APPLY <predicate expression>". The predicate expression may be of the form "f(<list of expressions>)" where f is an inline, schema-bound table-valued function. The expressions may be scalar expressions. Using this artificial query may help the system 100 make sure that the predicate can bind correctly to the table columns, and also to collect the schema dependencies from the predicate on the table columns and potentially other functions. This may be performed by performing an algebraization process on the artificial query tree.

Referring to block 305, if the user has permission to create a security policy, then the object may be created in metadata. The system 100 may then start processing the predicates. For each predicate, the system 100 may acquire a lock on the corresponding table (as depicted in block 303) and update the object in metadata to add the security policy. The system 100 may also further persist the schema-binding dependencies from the policy to the table of each predicate.

An example of a possible syntax for CREATE SECURITY POLICY may be shown as follows:

```
CREATE SECURITY POLICY security_policy_name
    { ADD FILTER PREDICATE security_predicate_function_name
    ({column_name | arguments}[, ...n]) ON table_name } [, ...n]
    | [ WITH ( STATE = { ON | OFF } ) ]
    | [ NOT FOR REPLICATION ]
```

Figure 4A:
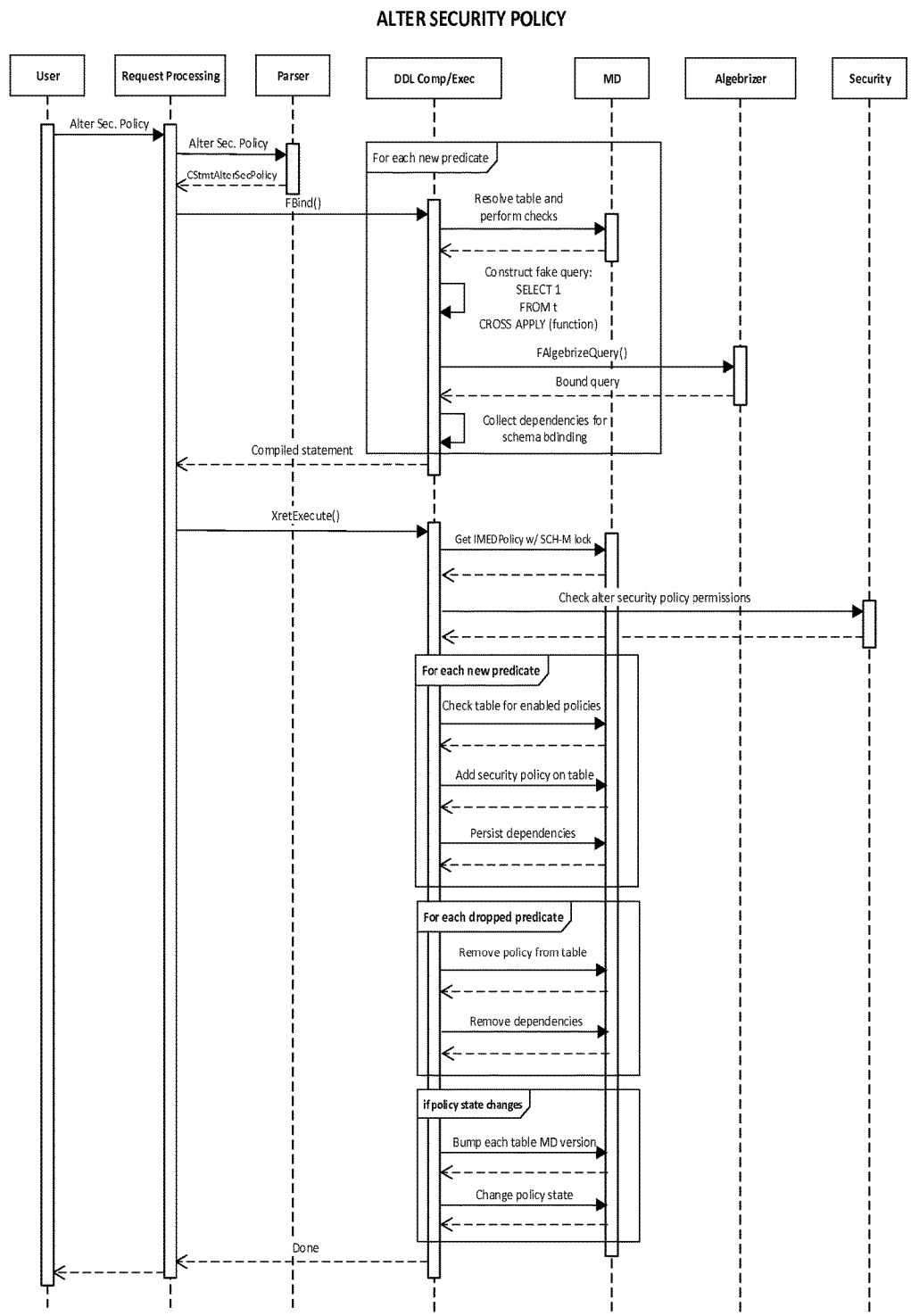
FIG. 4A is a workflow layout and illustration of the interactions of internal components when altering a security policy in a system.
Figure 4B:
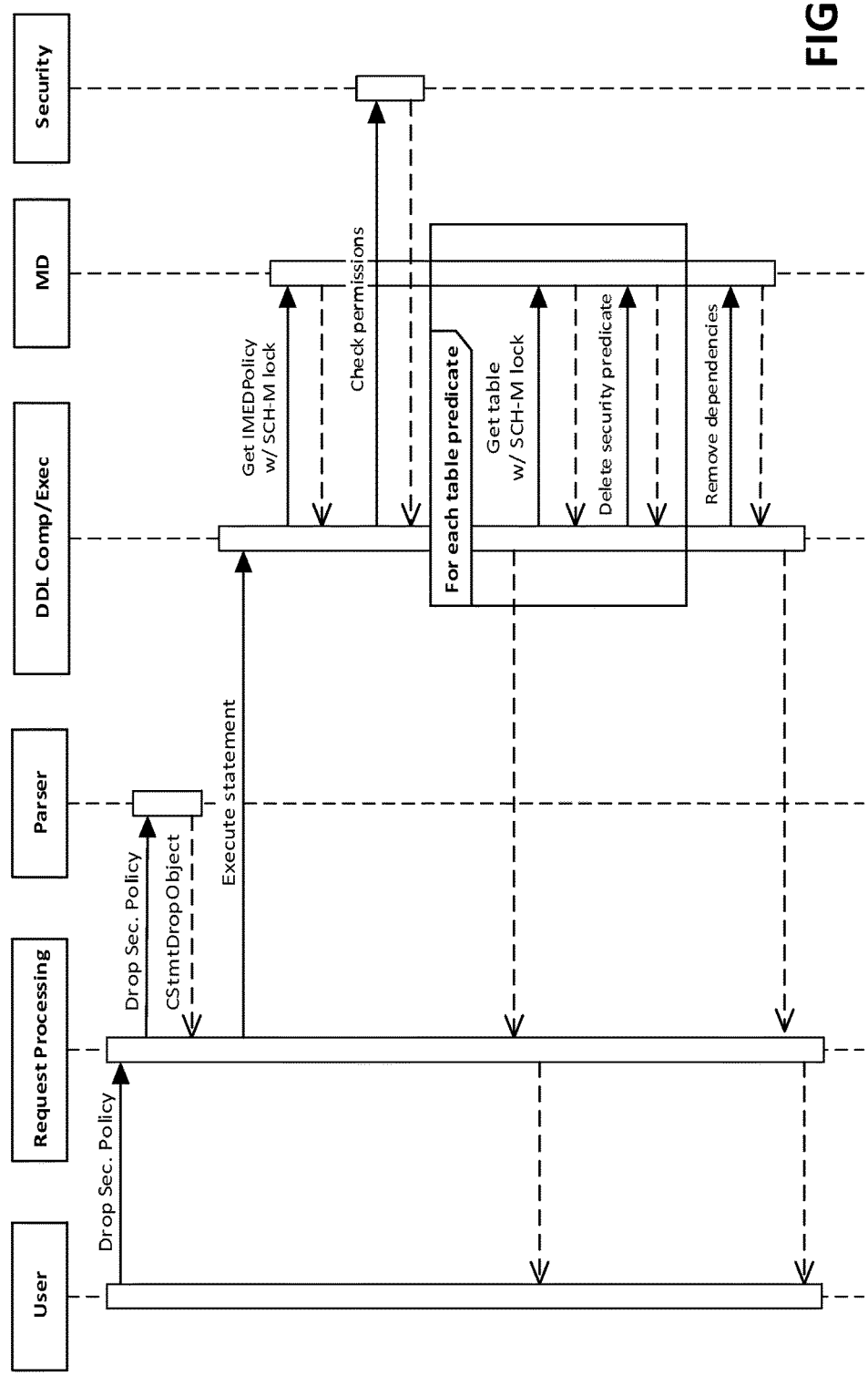
FIG. 4B is a workflow layout and illustration of the interactions of internal components when dropping a security policy in a system.
Figure 4C:
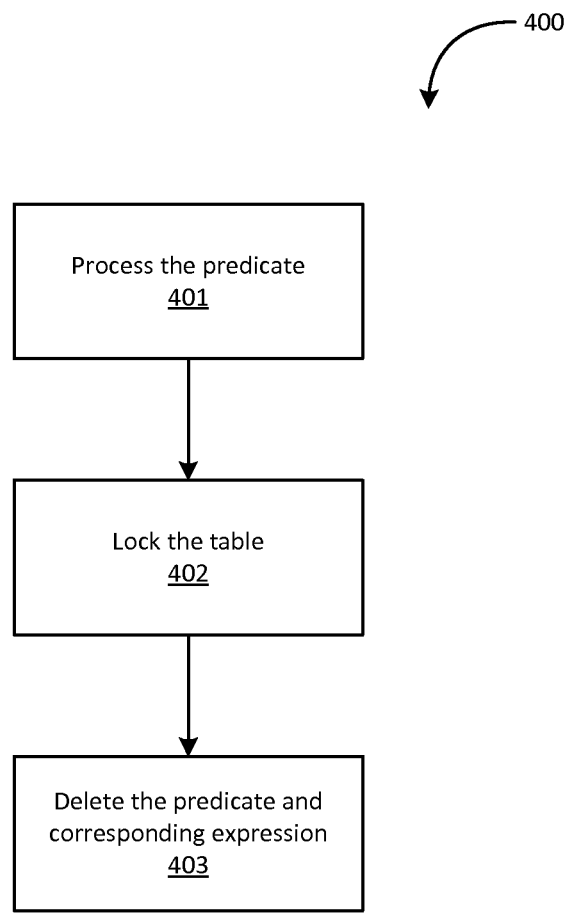
FIG. 4C is a block diagram representing the process of dropping a security policy in a system.

Referring to FIGS. 4A, 4B, and 4C, these figures depict how a security policy may be altered and/or dropped in system 100. FIG. 4A depicts the architectural and workflow layout of altering a security policy. FIG. 4A further depicts how the components interact in the alteration of a security policy. In one aspect of the present disclosure, the security policy may be altered when a user executes an ALTER SECURITY POLICY statement. The process for adding predicates through ALTER SECURITY POLICY may be similar to how the system 100 adds predicts when creating the policy (as described above in FIGS. 3A and 3B). An ALTER SECURITY POLICY, however, may not need to take a SCH-M lock on the tables. The system 100 may need to just change the policy state and recompile any queries on the tables. Furthermore, ALTER SECURITY POLICY may be handled in the system 100 as a drop-add predicate. In other words, altering a security policy may be processed by dropping a security policy and then adding a security policy. Adding a security policy may also be described as creating a security policy and the process in creating a security policy is described above.

An example of a possible syntax for ALTER SECURITY POLICY may be shown as follows:

```
ALTER SECURITY POLICY security_policy_name
    {
        { ADD FILTER PREDICATE
security_predicate_function_name({column_name | arguments}[, ...n])
            ON table_name }
    |
    { ALTER FILTER PREDICATE
security_predicate_function_name({column_name | arguments}[, ...n])
            ON table_name }
    |
        { DROP FILTER PREDICATE security_predicate_function_name ON
table_name }
    }[, ...n]
    | [ WITH ( STATE = { ON | OFF } ) ]
    | [ {ADD | DROP} NOT FOR REPLICATION ]
```

Now referring to FIGS. 4B and 4C, a DROP SECURITY POLICY is depicted. FIG. 4B depicts the architectural and workflow layout of dropping a security policy. FIG. 4B further depicts how the components interact in the dropping of a security policy. Referring to FIG. 4C, the system 100 may drop the security policy without requiring any new parser rules or statements. Block 401 depicts that the system 100 may process the predicate. In block 402, similar to CREATE SECURITY POLICY, the system 100 may cause a lock on the table. And in block 403, the system 100 may delete the predicate.

Figure 5A:
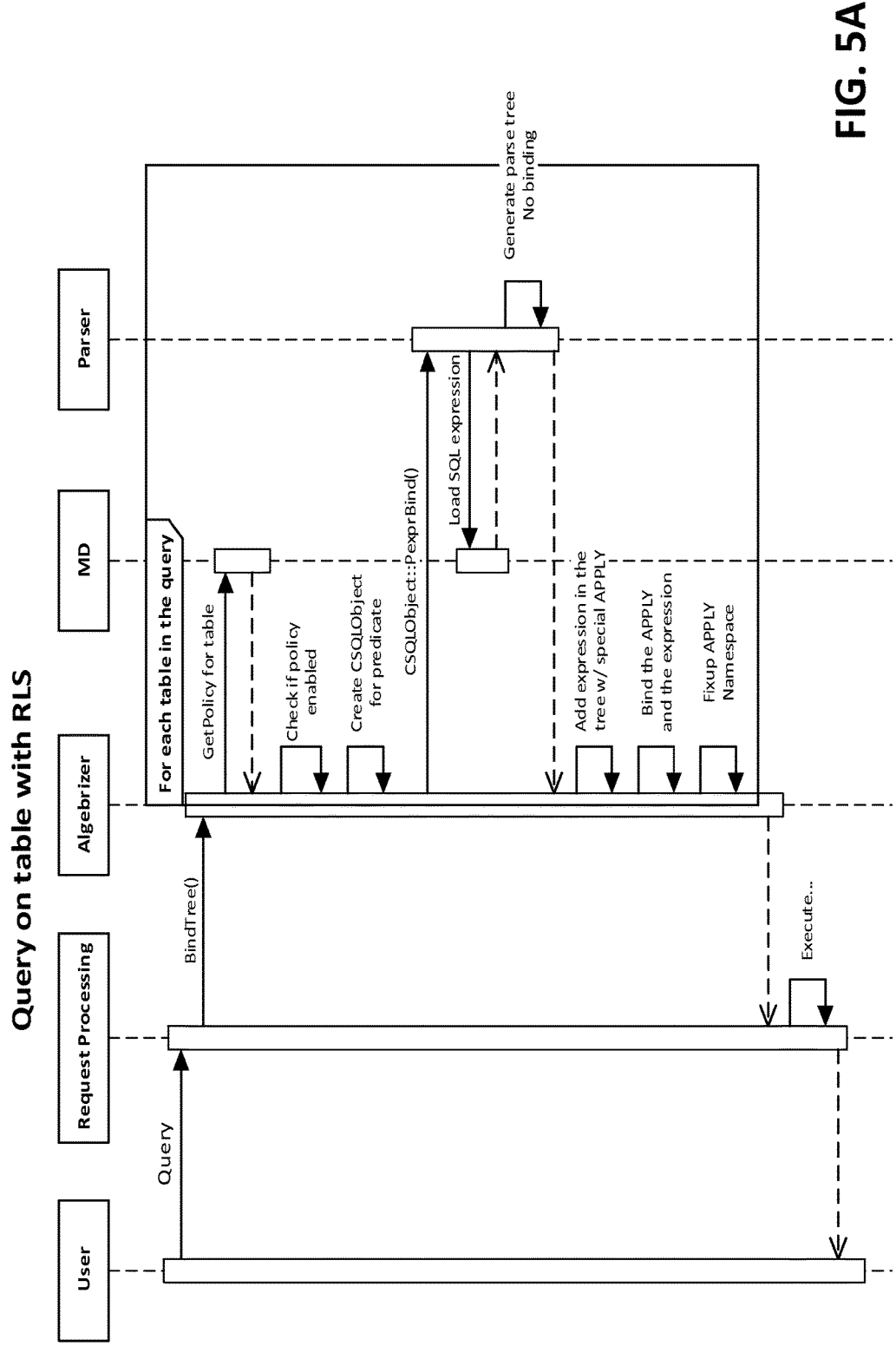
FIG. 5A is a workflow layout and illustration of the interactions of internal components when querying a table with row-level security in a system.

An example of a possible syntax for DROP SECURITY POLICY may be shown as follows:
    DROP SECURITY POLICY security_policy_name Referring now to FIGS. 5A and 5B, these figures depict how querying the table in system 100 with row-level security may be performed. FIG. 5A depicts the architectural and workflow layout of querying a table. FIG. 5A further depicts how the components interact when querying a table with row-level security. When querying a table with row-level security, the system 100 may perform a bind operation and determine that the object is a user table. The system 100 may then further check if the table has an enabled security policy.

If the table does have an enabled security policy, the system 100 may load the security predicate expression from metadata and pass the security predicate expression to the parser, which may then apply a grammar to parse the security predicate expression. The system 100 may then return the parsed tree. The binding may, in some cases, be performed after moving the predicate tree in the original query tree. Once a predicate tree is obtained, the system 100 may generate a special operator, which will have the original operator on the left side and the security predicate (essentially a function call) on the right side. Finally, the system 100 may then bind an apply operator, which essentially is binding the right side of the expression, since the left operand has already been bound.

Figure 5B:
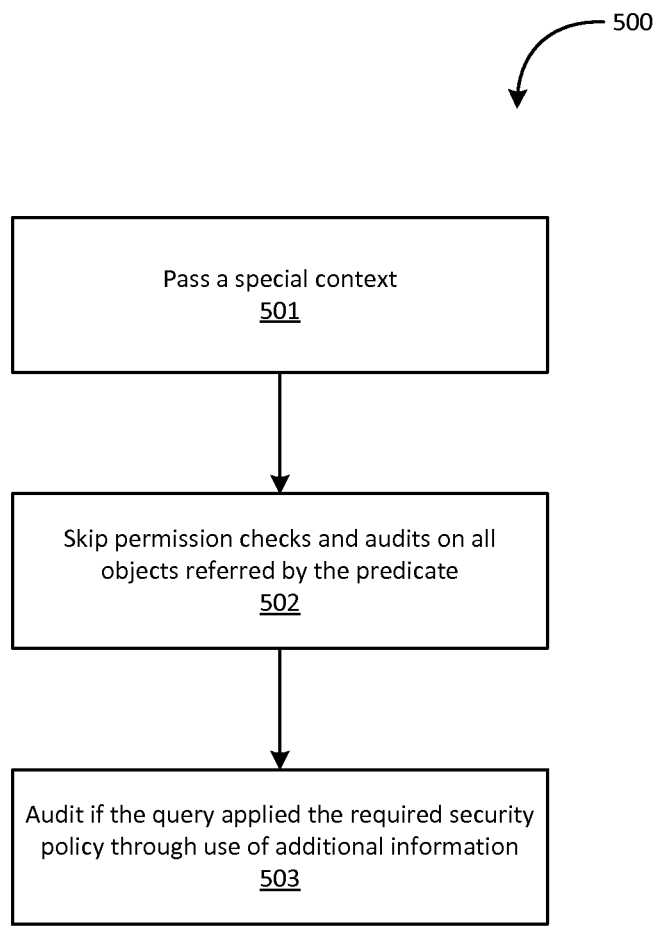
FIG. 5B is a block diagram representing the process of querying a table with row-level security in a system.

Referring to FIG. 5B, block 501 depicts the process of checking or auditing for permission on the table. In one particular aspect, the system 100 may bypass check for permission on the objects referenced by the security predicate (as depicted in block 502). Users that query a table with row-level security may only need permissions on the table and the accessed columns. To achieve this, while binding the security predicate, the system 100 may first pass a special context to skip permission checks and audits on all the objects referenced by the predicate and not directly by the user query (as depicted in block 501). Even though the system 100 may not want to audit the access on the objects referenced by the security predicate, the system 100 may still want to audit that the query applied the required security policy (as depicted by block 503). For this purpose, the audit describing the table access may be accompanied by the additional information describing the applied security predicate.

Figure 6:
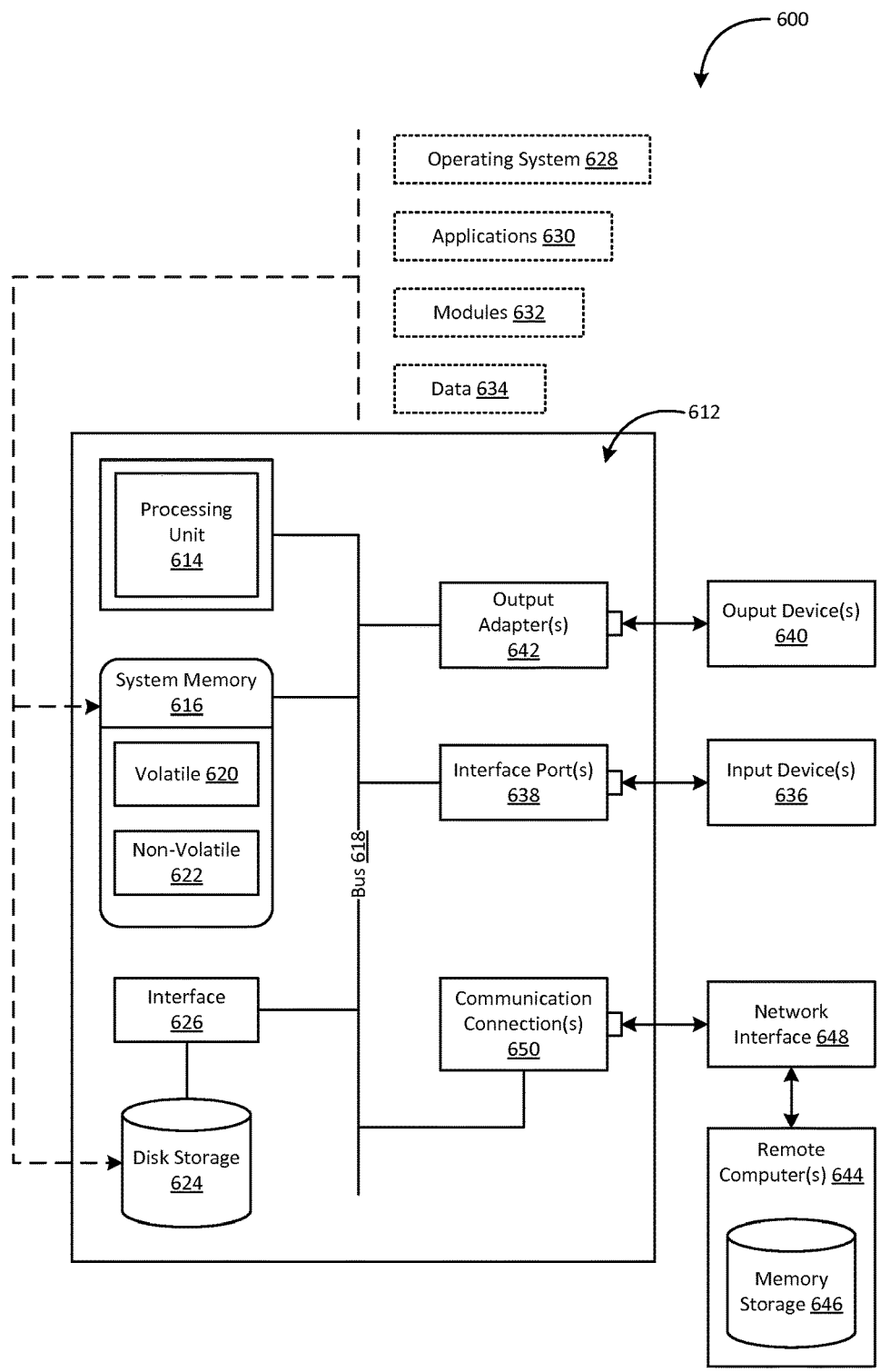
FIG. 6 illustrates an exemplary operating environment, wherein the novel aspects of the present invention may be employed.

Now referring to FIG. 6, an exemplary environment 600 for implementing various aspects of the invention includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/non-removable, volatile/non-volatile computer storage media. FIG. 6 illustrates, for example, a disk storage 624. Disk storage 624 includes, but is not limited to, devices like a magnetic disk drive, floppy disk drive, tape drive, Jaz drive, Zip drive, LS-100 drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in the suitable operating environment 600. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the present invention can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers, among other output devices 640, which require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device, or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

As used in this application, the terms "component, system," "manager," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the aspects disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the aspects disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium.

The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface (API), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The previous description of the aspects is provided to enable a person skilled in the art to make or use the aspects. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A database management system that processes queries over a database with row-level access control according to a security policy, the system comprising:
    a computing device communicatively coupled to a storage device, the computing device, when activated, maintaining a database comprising a table set of tables, each of the tables respectively comprising a plurality of rows; and
    one or more memories having stored thereon computer readable instructions that, upon execution by the computing device, cause the system at least to:
    receive, for a selected table of the table set, a table-valued function that receives a parameter and generates an output table comprising, for each row of the selected table, an indicator that indicates whether the security policy permits access to the row according to the parameter;
    associate the table-valued function with the selected table;
    receive a query that is associated with a query parameter, the query comprising a query language statement comprising a request to access a first column of a row of the plurality of rows of the selected table;
    invoke the table-valued function with the query parameter as the parameter of the table-valued function to generate the output table; and
    apply the query language statement only to the rows of the selected table for which the indicators of the output table indicate that the security policy permits access according to the query parameter.

2. The system of claim 1, wherein the one or more memories have stored thereon computer-readable instructions that, upon execution by the computing device, cause the system at least to: override the row-level access control during at least one of algebraization of the query, optimization of the query, or execution of a query plan produced by optimization.

3. The system of claim 1, further comprising one or more memories having stored thereon computer-readable instructions that, upon execution by the computing device, cause the system at least to: perform optimization of the query based at least in part on the output table generated by the table-valued function.

4. The system of claim 1, further comprising one or more memories having stored thereon computer-readable instructions that, upon execution by the computing device, cause the system at least to form a query representation comprising a predicate node indicative of an association between the plurality of rows of the selected table and the table-valued function.

5. The system of claim 1, further comprising one or more memories having stored thereon computer-readable instructions that, upon execution by the computing device, cause the system at least to:
    receive information indicative of the query parameter for use in evaluating the table-valued function; and
    evaluate the table-valued function based at least in part on the information.

6. The system of claim 1, wherein the table-valued function generates the output table by:
    joining the rows of the selected table with a predicate node of the database; and generating the output table comprising the rows of the selected table wherein the query parameter matches the predicate node.

7. The system of claim 6, wherein:
the predicate node further comprises a table-valued function that generates a predicate table;
joining the rows of the selected table further comprises: applying a cross-apply operator between the rows of the selected table and rows of the predicate table generated by the predicate node; and
generating the output table further comprises: identifying, as the rows of the selected table for which the indicators of the output table indicate that the security policy permits access according to the query parameter, the rows of the selected table that are identified by the cross-apply operator.

8. A method of processing queries against a database with row-level access control according to a security policy, the database comprising a table set of tables, each of the tables respectively comprising a plurality of rows, and the method comprising:
receiving, for a selected table of the table set, a table-valued function that receives a parameter and generates an output table comprising, for each row of the selected table, an indicator that indicates whether the security policy permits access to the row according to the parameter;
associating the table-valued function with the selected table;
receiving a query that is associated with a query parameter, the query comprising a query language statement comprising a request to access a first column of a row of the plurality of rows of the selected table;
invoking the table-valued function with the query parameter as the parameter of the table-valued function to generate the output table; and
applying the query language statement only to the rows of the selected table for which the indicators of the output table indicate that the security policy permits access according to the query parameter.

9. The method of claim 8, further comprising: overriding the row-level access control occurs during at least one of algebraization of the query, optimization of the query, or execution of a query plan produced by optimization.

10. The method of claim 8, further comprising: performing optimization of the query based at least in part on a result of evaluating the table-valued function.

11. The method of claim 8, further comprising: forming a query representation comprising a predicate node indicative of an association between the plurality of rows of the selected table and the table-valued function.

12. The method of claim 8, further:
receiving information indicative of a value for the query parameter for use in evaluating the table-valued function; and
evaluating the table-valued function based at least in part on the value of the query parameter.

13. The method of claim 8, wherein the table-valued function generates the output table by:
joining the rows of the selected table with a predicate node of the database; and
generating the output table comprising the rows of the selected table wherein the query parameter matches the predicate node.

14. The method of claim 13, wherein:
the predicate node further comprises a table-valued function that generates a predicate table;
joining the rows of the selected table further comprises: applying a cross-apply operator between the rows of the selected table and rows of the predicate table generated by the predicate node; and
generating the output table further comprises: identifying, as the rows of the selected table for which the indicators of the output table indicate that the security policy permits access according to the query parameter, the rows of the selected table that are identified by the cross-apply operator.

15. A computer-readable storage device having stored thereon instructions that, upon execution by one or more computing devices, cause the one or more computing devices at least to:
receive, for a selected table of a table set of tables maintained in a database with row-level access control according to a security policy, each of the tables respectively comprising a plurality of rows, a table-valued function that receives a parameter and generates an output table comprising, for each row of the selected table, an indicator that indicates whether the security policy permits access to the row according to the parameter;
associate the table-valued function with the selected table;
receive a query that is associated with a query parameter, the query comprising a query language statement comprising a request to access a first column of a row of the plurality of rows of the selected table;
invoke the table-valued function with the query parameter as the parameter of the table-valued function to generate the output table; and
apply the query language statement only to the rows of the selected table for which the indicators of the output table indicate that the security policy permits access according to the query parameter.

16. The computer-readable storage device of claim 15, further comprising instructions that, upon execution by the one or more computing devices, cause the one or more computing devices at least to: override the row-level access control during at least one of algebraization of the query, optimization of the query, or execution of a query plan produced by optimization.

17. The computer-readable storage device of claim 15, further comprising instructions that, upon execution by the one or more computing devices, cause the one or more computing devices at least to perform optimization of the query based at least in part on a result of evaluating the table-valued function.

18. The computer-readable storage device of claim 15, further comprising instructions that, upon execution by the one or more computing devices, cause the one or more computing devices at least to form a query representation comprising a predicate node indicative of an association between the plurality of rows of the selected table and the table-valued function.

19. The computer-readable storage device of claim 15, wherein the table-valued function generates the output table by:
joining the rows of the selected table with a predicate node of the database; and
generating the output table comprising the rows of the selected table wherein the query parameter matches the predicate node.

20. The computer-readable storage device of claim 19, wherein:
the predicate node further comprises a table-valued function that generates a predicate table;

joining the rows of the selected table further comprises:
applying a cross-apply operator between the rows of the selected table and the rows of the predicate table generated by the predicate node; and generating the output table further comprises: identifying, as the rows of the selected table for which the indicators of the output table indicate that the security policy permits access according to the query parameter, the rows of the selected table that are identified by the cross-apply operator.

* * * * *